United States Patent

Dohrendorf

[15] 3,680,174
[45] Aug. 1, 1972

[54] METHOD OF AND APPARATUS FOR GRIPPING A FISH FOR MECHANICAL DRESSING

[72] Inventor: Franz Friedrich Johannes Dohrendorf, Lubeck, Germany

[73] Assignee: Nordischer Maschinenbau Rud Baader, Lubeck, Germany

[22] Filed: Aug. 13, 1969

[21] Appl. No.: 849,739

[52] U.S. Cl............................................17/45, 17/55
[51] Int. Cl................................................A22c 25/08
[58] Field of Search...................17/52, 55, 63, 54, 45

[56] References Cited

UNITED STATES PATENTS 3,123,853  3/1964  Radloff et al. .....................17/63
2,546,346  3/1951  Oates................................17/54
2,959,810  11/1960  Cameron..........................17/63

*Primary Examiner*—Lucie H. Laudenslager
*Attorney*—Richards & Geier

[57] ABSTRACT

The fish is gripped and moved in vertical position suspended from its pectoral fins with its head pointing upwardly and its belly forwardly between parallel guide means forming parts of a reciprocating slide and being spreadable outwardly against the action of springs. The fish is moved between the guide means towards centering means arranged in the vertical mid-plane of the guide path piercing the gap formed between the collar bones of the fish and indenting its belly from the outside. Spring loaded back supporting means cooperating with the guide means snap in behind the thus centered fish engaging either side of it at its neck zone thereby firmly holding the same in a surprisingly simple yet reliable manner. The fish held in this position is moved with the slide towards and past cutter discs journalled in a machine frame and rotating in planes including approximately angles of 45° with and at either side of the vertical mid-plane of the guide path. The rotating cutter discs sever the head of the fish from its body during which operation the head is progressively bent backwardly, thereby gaining the lobes of meat disposed in the neck of the fish.

1 Claim, 3 Drawing Figures

PATENTED AUG 1 1972

3,680,174

METHOD OF AND APPARATUS FOR GRIPPING A FISH FOR MECHANICAL DRESSING

BACKGROUND OF THE INVENTION

1. Field of Invention

This invention relates to a method and an apparatus for gripping a fish and mechanically dressing the same as used in the fish processing industry. To this end it is indispensable to safely hold and guide it for overcoming the accompanying processing resistance, and to grip it in a well-defined zone for obtaining products free of bones at a high output capacity. This well-defined gripping of the fish is of particular importance for carrying through the first processing steps such as cutting out of the throat, severing the head from the body, slaughtering of the fish etc.

2. Description of the Prior Art

According to a known method for transporting fish in fish processing machines the fish is gripped at the forward bow of the jaw and advanced towards the guides and tooles of the fish processing machine. This method allows to grip the fish at the head in an unobjectionable manner, however is limited to fish of which the throat has not been cut out and the head has not been removed yet.

Another known method for opening the abdomen cavity of not yet slaughtered fish provides that after severing its isthmus (the connection between the lower ends of the collar bones and the rear ends of the lower jaw) the abdomen cavity is cut open along its entire length while supporting and providing a centered guidance in the interior of the abdomen cavity with the aid of the abutting ends of the collar bones. This method, indeed, allows exact alignment of the fish for slitting the belly, but not the gripping of the fish for removing the head, slaughtering, or the like.

The broad object of this invention is to provide a method for firmly gripping a fish in the zone of its collar bones and to hold the same in a predetermined position exactly aligned relative to the dressing tools.

A more defined object of this invention is to provide a method for firmly gripping a fish in the zone of its collar bones, holding the same in a predetermined vertical position suspended from below its pectoral fins with its head pointing upwardly and its belly forwardly towards the cutting tools and moving the same past the cutting tools so as to sever its head from the body in the region of its collar bones.

Another object of this invention is to provide an apparatus for dressing a fish, wherein it is firmly gripped in the region of its collar bones and aligned in a predetermined position relative to the dressing tools.

Further objects and features of this invention will become apparent as the description proceeds.

SUMMARY OF THE INVENTION

The method of gripping a fish in the region of its collar bones according to the invention in its broadest aspect includes the following steps:

a. centering a fish by indenting its abdominal integuments between the collar bones from the outside;

b. aligning its sides symmetrically to the zone of impression; and c. firmly gripping the fish by exerting pressure against either side of its back in a direction towards the zone of indentation.

This method allows in a surprisingly simple manner to securely hold a fish in a predetermined position aligned to any kinds of dressing tools to perform working steps in the region of the collar bones and gills.

This method of gripping a fish may advantageously be used to severe the head of the fish from its body in the region of its collar bones providing that the fish is suspended vertically from below its pectoral fins with its head pointing upwardly and is characterized by the steps:

a. manually rotating the fish about its longitudinal axis into a position in which the gap formed between its collar bones at the belly side is disposed between the suspension planes;

b. centering the fish in the gap formed between its collar bones by advancing it in the direction of its belly side; and c. firmly gripping the thus centered fish by exerting pressure symmetrically against either side of its back adjacent the suspension points in a direction towards the gap.

The apparatus for gripping a fish in the region of its collar bones includes in a known manner a pair of laterally pivotally supported guide rails arranged in parallel spaced relation to each other adapted to open symmetrically relative to the vertical mid-plane of the guide rails and is characterized by the arrangement of a centering tip in the vertical mid-plane between the guide rails adjacent their upper edges, and opposed thereto between the guide rails a pair of back supports one mounted on each guide rail so as to open in unison.

The opening planes of guide rails and the back support may according to the invention include an angle of approximately 90°.

An advantageous embodiment for acommodating fish of different sizes provides that upon increasing the space between the back supports their distance from the centering tip will be increased simultaneously.

In order to allow movement of the centered and gripped fish the invention provides that the guide rails, the back supports, and the centering tip are arranged on a common reciprocating slide.

Another means for adapting the apparatus to different sizes of fish provides that the centering tip is movable along the vertical mid-plane between the guide rails against the force of a spring thereby varying its distance from the back supports.

One exemplified embodiment according to this invention in its application for removing the heads of fish shall now be described in detail in connection with the accompanying drawing.

DESCRIPTION OF THE PREFERRED EMBODIMENT

Figure 1:
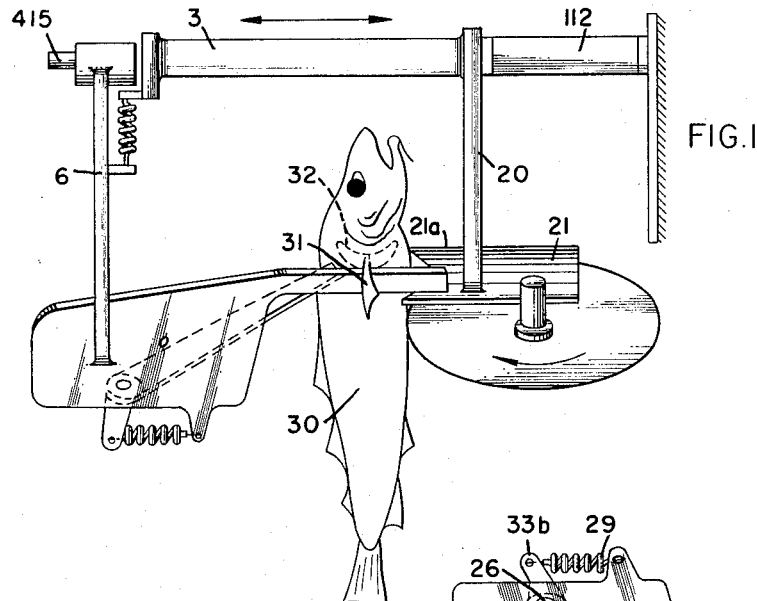
FIG. 1 is a side view of the apparatus according to the invention.
Figure 2:
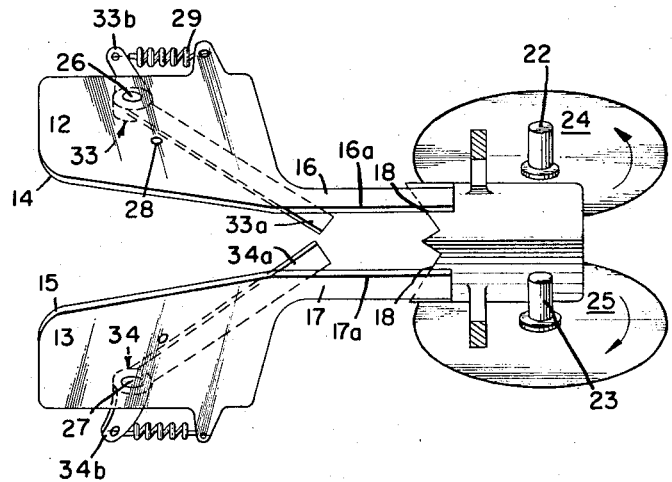
FIG. 2 is a top view of the apparatus shown in FIG. 1.
Figure 3:
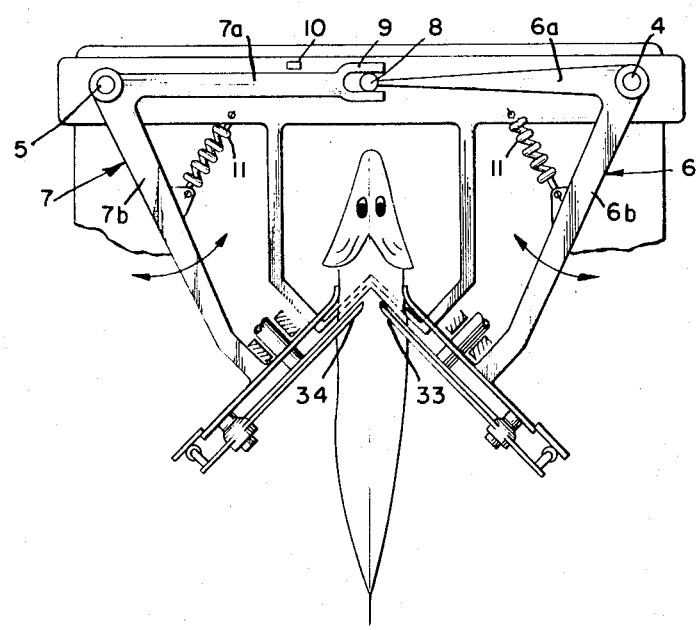
FIG. 3 is an end view.

Two cutter drive shafts 22, 23 carrying cutter discs 24, 25 are journalled in a machine frame (not illustrated) and are driven in any suitable manner. The cutter discs are arranged in two planes inclined in a roof-like fashion to each other and including an angle of approximately 90°.

Two guides 1, also rigidly arranged in the machine frame are extending in parallel relation to each other and are each arranged between the plane of the cutter discs and the planes extending in parallel relation thereto including the axii of the cutter drive shafts. A slide 3 arranged on the guides 1, is movable to and fro in any suitable manner. Brackets 20 are arranged at the rear end of the slide carrying an inversely V-shaped belly support 21 disposed closely above the cutter discs. A centering projection 19 extends forwardly from the upwardly and rearwardly obliquely extending forward edges 18 of the belly support 21 and forms a centering point disposed in the height of the "ridge" of the belly support. A pair of bell crank levers 6, 7 each pivotally supported on a pin 4, and 5 respectively, extending in parallel relation to the guides 1, are arranged at the forward end of the slide 3. Each bell crank lever 6, 7 includes a substantially horizontally inwardly extending arm 6a, and 7a respectively, and downwardly extending arm 6b, and 7b respectively, both arms of each bell crank lever including an acute angle between them and of which the free end of one of the horizontally extending arms 7a is formed as a fork 9 slideably engaged by a glide member 8 arranged at the free end of the other horizontally extending arm 6a, thereby synchronizing the pivoting movement of the pair of bell crank levers 6, 7.

Each downwardly extending arm 6b, 7b of the bell crank lever 6, 7 is engage by the one end of a helical tension spring 11 secured with its other end to the slide 3, thereby urging the downwardly extending arms 6b and 7b of the bell crank levers 6 and 7 in a counter-rotating direction towards each other. This movement is limited by a stop 10 arranged on the slide 3 and engaged by one of the horizontal arms 7a of the bell crank levers 6, 7.

At the free end of each of the downwardly extending arms 6b and 7b of the bell crank levers 6, 7 a guide plate 12, and 13 respectively, is secured. The guide plates 12 and 13 include an angle of substantially 90° between each other, extending adjacent in parallel closely spaced relation above the planes of the cutter discs 24 and 25 and the side surfaces of the belly support 21. The guide plates 12 and 13 serve to insert a fish, as shown in FIG. 1, and to this end the upper edges 14 and 15 thereof converge in a direction towards the cutter discs 24, 25 merging into parallel inner edges 16a and 17a of guide rails 16 and 17 arranged symmetrically to the ridge 21a of the belly support 21. The guide rails are forming integral portions of the guide plates 12 and 13. At their lower sides the guide plates 12 and 13 carry each a double armed lever-like back support 33, and 34 respectively, pivotally supported on bolts 26, and 27 respectively, extending in the exemplified embodiment perpendicularly to the planes of the guide plates. The free ends of the long lever arms 33a and 34a, which are pivoting in the planes of the respective guide plates 12 and 13, extend into the free space formed between the upper edges 16a and 17a of the guide rails 16 and 17 and are urged upwardly by helical tension springs 29 arranged between the free ends of the short arms 33b and 34b and the guide plates 12 and 13. The upward movement of the long arms 33a and 34a is limited by stops 28 provided on the guide plates 12 and 13.

The operation of the above described apparatus is as follows: The fish 30 suitably gripped from the neck in its eye sockets and freely suspended is pushed between the guide rails 16, 17 with its belly directed forwardly in such a manner that it slides along its pectoral fins 31 until the centering point 19 pierces the gap formed between the collar bones 32 in the rear of the gill cavity, while simultaneously impressing the abdominal integuments. The back supports 33 and 34 are pivoted away from each other by the sides of the fish when being inserted, and after the fish has been moved far enough will snap back into their initial positions firmly gripping the fish at either side symmetrically to its middle plane, when it is now advanced towards the rotating cutter discs 24 and 25 which sever the head from the body of the fish. Due to the different positions of the centering point 19 which is disposed above the upper edges of the guide rails 16 and 17 and of the free ends of the back supports 33 and 34 which are disposed below the guide rails 16a and 17a a bending moment is exerted on the head of the fish while being severed, causing the head to increasingly pivot towards the neck during the cutting operation whereby the lobe of meat in the neck is gained in an ideal manner regardless of the size of the fish. At the end of the advance movement of the slide the head of the fish slides down a chute (not shown) arranged below the rear edge of the cutter discs 24 and 25, while the body of the fish drops on a conveyor (also not shown).

The pivot points of the back supports 33 and 34 are, contrary to the illustrated embodiment, suitably selected in such a manner that upon an increasing distance between the upper edges 16a and 17a of the guide rails 16 and 17, due to larger size fish, the distance between the centering point 19 and the back supports 33 and 34 will also increase. According to another not illustrated embodiment this distance may be made variable by arranging the centering point movably along its longitudinal axis against the force of a spring.

It is understood that the invention shall neither be restricted to the illustrated and described device for gripping a fish, nor to its employment for severing the heads of fish from their bodies, but may also be used in the same advantageous manner for any processing steps carried through in the zone of the gills and the abdomen cavity.

What is claimed is:

1. The method of gripping a fish for mechanical dressing, which comprises suspending the fish on both sides from below its pectoral fins adjacent its backbone with the head of the fish pointing upwardly, rotating the fish about its longitudinal axis into a position in which the gap between its collar bones at the belly side is located between the suspension planes, centering the fish in said gap by moving it in the direction of its belly and by indenting its abdomen by a centering point in its symmetrical plane between the collar bones and firmly gripping the centered fish by exerting pressure symmetrically against either side of its back adjacent its suspension points in a drection towards said gap.

* * * * *